United States Patent
Huang

(10) Patent No.: US 8,651,509 B1
(45) Date of Patent: Feb. 18, 2014

(54) TOW STRAP APPARATUS

(71) Applicant: Han-Ching Huang, Taichung (TW)

(72) Inventor: Han-Ching Huang, Taichung (TW)

(*) Notice: Subject to any disclaimer, the term of this patent is extended or adjusted under 35 U.S.C. 154(b) by 0 days.

(21) Appl. No.: 13/792,124

(22) Filed: Mar. 10, 2013

(51) Int. Cl.
*B60D 1/18* (2006.01)

(52) U.S. Cl.
USPC .................................................. 280/480.1

(58) Field of Classification Search
USPC ......... 280/480.1, 457, 480; 242/387; 24/71.1, 24/68.1; 254/218
See application file for complete search history.

(56) References Cited

U.S. PATENT DOCUMENTS

| | | | | |
|---|---|---|---|---|
| 4,301,977 A | * | 11/1981 | Yang | 242/375.3 |
| 4,640,472 A | * | 2/1987 | Epple | 242/375.3 |
| 5,297,752 A | * | 3/1994 | Brown et al. | 242/375.3 |
| 5,628,470 A | * | 5/1997 | Ray et al. | 242/375.3 |
| 5,769,345 A | * | 6/1998 | Morner et al. | 242/375.3 |
| 5,975,454 A | * | 11/1999 | Potter et al. | 242/395 |
| 6,405,960 B2 | * | 6/2002 | Yano | 242/375.3 |
| 6,905,087 B2 | * | 6/2005 | Chen | 242/375.3 |
| 7,350,767 B2 | * | 4/2008 | Huang | 254/218 |
| 7,766,271 B1 | * | 8/2010 | Confoey | 242/395 |
| 7,874,047 B2 | * | 1/2011 | Breeden | 24/68 CD |
| 8,444,222 B2 | * | 5/2013 | Buckingham et al. | 297/253 |
| 2009/0121204 A1 | * | 5/2009 | Guyard | 254/218 |

* cited by examiner

Primary Examiner — Tony Winner

(57) ABSTRACT

A tow strap apparatus includes a casing, a reel, a tow strap, a driving unit and a speed-increasing gearbox. The reel is rotationally placed in the casing. The tow strap is reeled on the reel. The driving unit is supported on the casing. The speed-increasing gearbox connects the driving unit to the reel.

10 Claims, 8 Drawing Sheets

TOW STRAP APPARATUS

BACKGROUND OF INVENTION

1. Field of Invention

The present invention relates to a tow strap and, more particularly, to a tow strap apparatus equipped with a speed-increasing gearbox.

2. Related Prior Art

A vehicle sometimes breaks or gets stuck in the sand, mud or snow. To get such a vehicle out of the trouble, it can be tied to another vehicle via a rope or tow strap. The first vehicle can be towed and rescued by the second vehicle.

A tow strap is often made of woven fabric and made of an adequate length. However, it is troublesome to reel the tow strap when the tow strap is not in use.

As disclosed in U.S. Pat. No. 7,942,360, a conventional tow strap apparatus 10 includes a casing 12, a tow strap 16, a reel 28 and two coil springs 50. The casing 12 includes two opposite apertures 15 defined therein. The tow strap 16 includes two hooks 20 tied to a webbing 18. The reel 28 includes a hub 36 that includes two halves. Teeth 40 are formed on each half of the hub 36. The webbing 18 is inserted through a gap between the halves of the hub 36. The webbing 18 is firmly held onto the hub 36 by the teeth 40. The reel 28 is placed in the casing 12. Each end of the webbing 18 is placed out of the casing 12 through an aperture 15. The hooks 20 are placed out of the casing 12. Each hook 20 is engaged with a vehicle in use. Each coil spring 52 is connected to the casing 12 at an end and connected to the reel 28 at another end. The coil springs 50 are loaded when the webbing 18 is released from the reel 28. The webbing 18 is reeled on the reel 28 by the coil springs 50 when the hooks 20 are detached from the vehicles.

The use of the conventional tow strap apparatus 10 is not without any problem. At first, the webbing 18 is inevitably damaged by the teeth 40 and could be broken into two halves after some time of use. Secondly, the diameter of the coil springs 50 is large as the webbing 18 is long. A large coil spring requires a lot of steel which is heavy and expensive.

Therefore, the present invention is intended to obviate or at least alleviate the problems encountered in prior art.

SUMMARY OF INVENTION

It is the primary objective of the present invention to provide a light tow strap apparatus that winds a tow strap fast.

To achieve the foregoing objective, the tow strap apparatus includes a casing, a reel, a tow strap, a driving unit and a speed-increasing gearbox.

The reel is rotationally placed in the casing. The tow strap is reeled on the reel. The driving unit is supported on the casing. The speed-increasing gearbox connects the driving unit to the reel.

Other objectives, advantages and features of the present invention will be apparent from the following description referring to the attached drawings.

BRIEF DESCRIPTION OF DRAWINGS

The present invention will be described via detailed illustration of two embodiments referring to the drawings wherein.

DETAILED DESCRIPTION OF EMBODIMENTS

Figure 1:
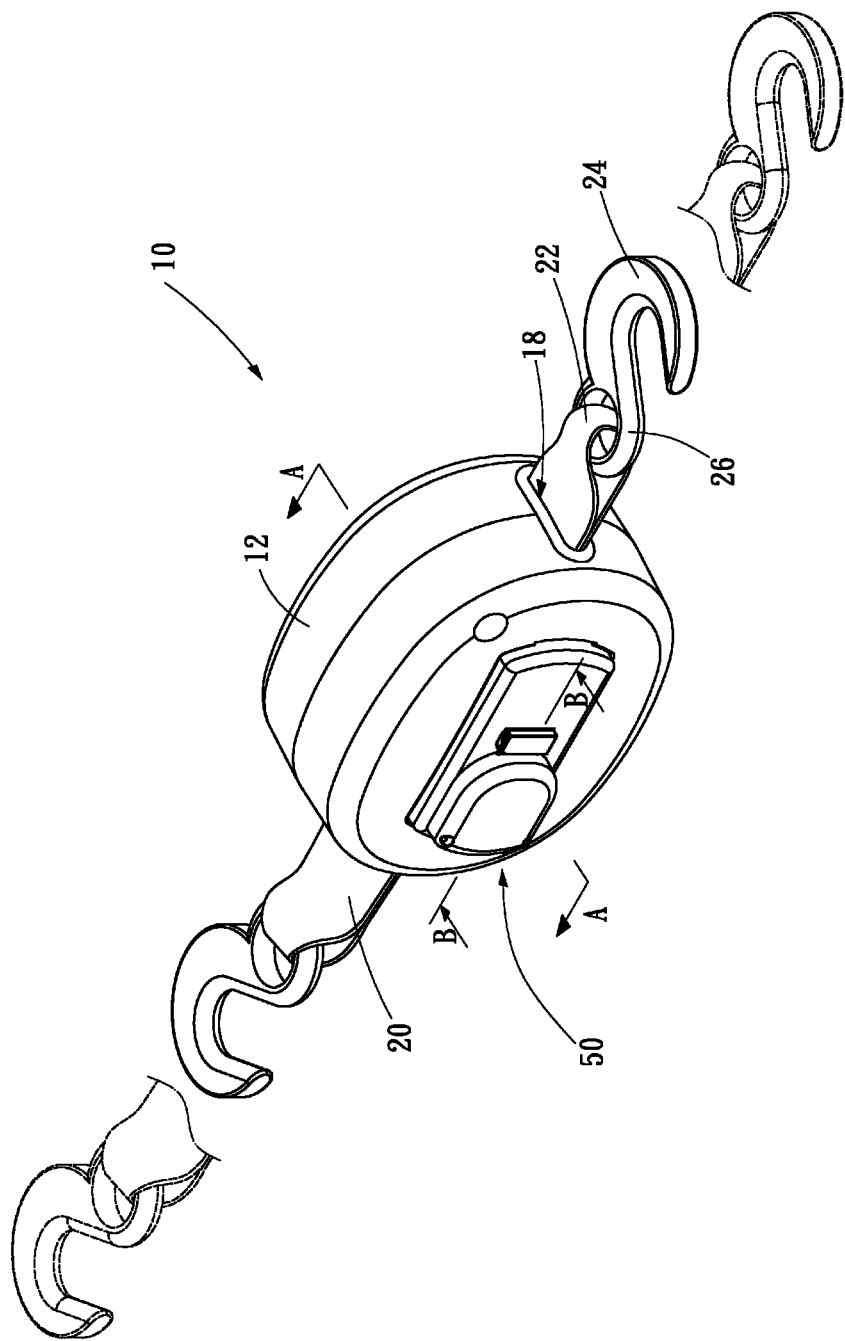
FIG. 1 is a perspective view of a tow strap apparatus according to the first embodiment of the present invention.
Figure 2:
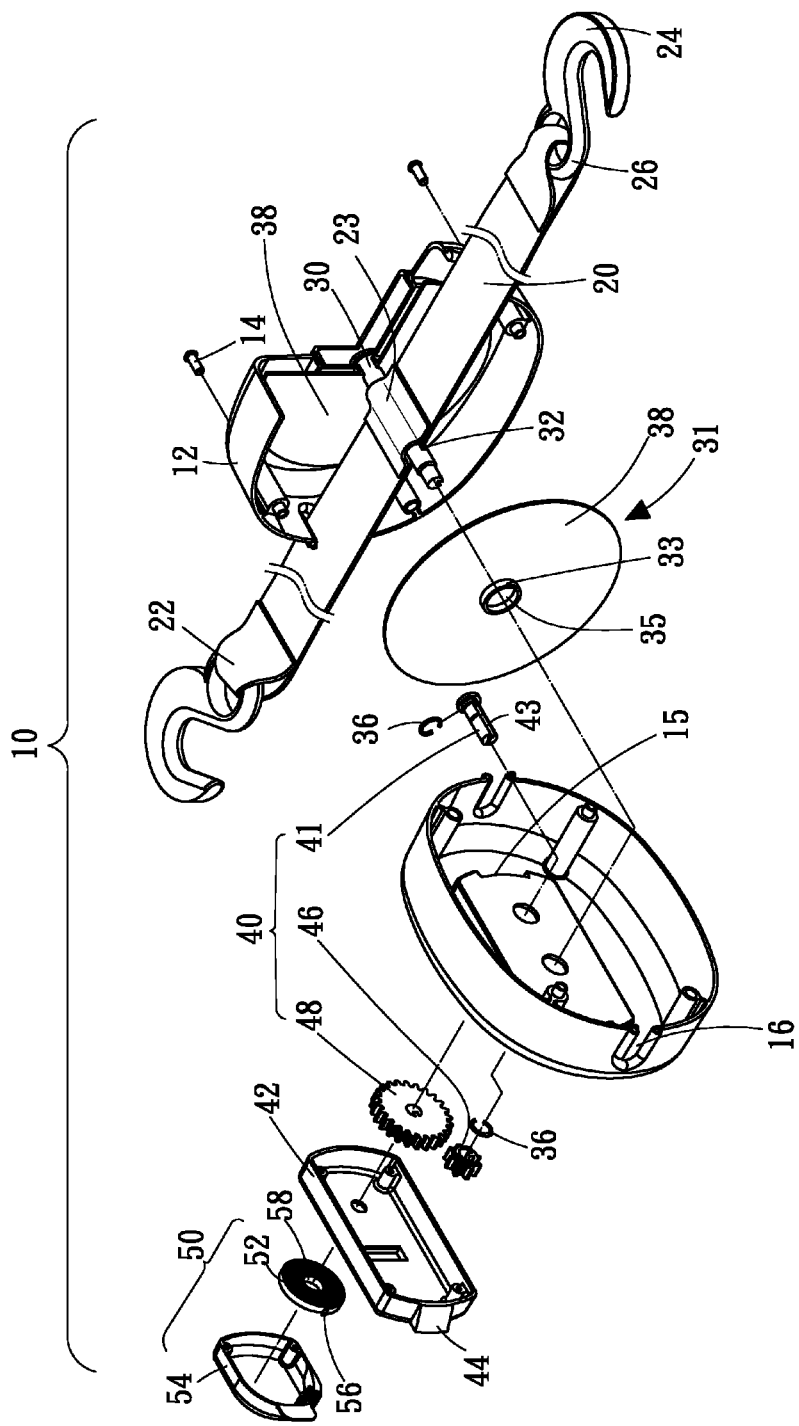
FIG. 2 is an exploded view of the tow strap apparatus of FIG. 1.

Referring to FIGS. 1 to 6, a tow strap apparatus 10 according to a first embodiment of the present invention is shown. Referring to FIG. 1, the tow strap apparatus 10 includes a tow strap 20, a casing 12, a reel 31, a driving unit 50 and a speed-increasing gearbox 40.

Figure 6:
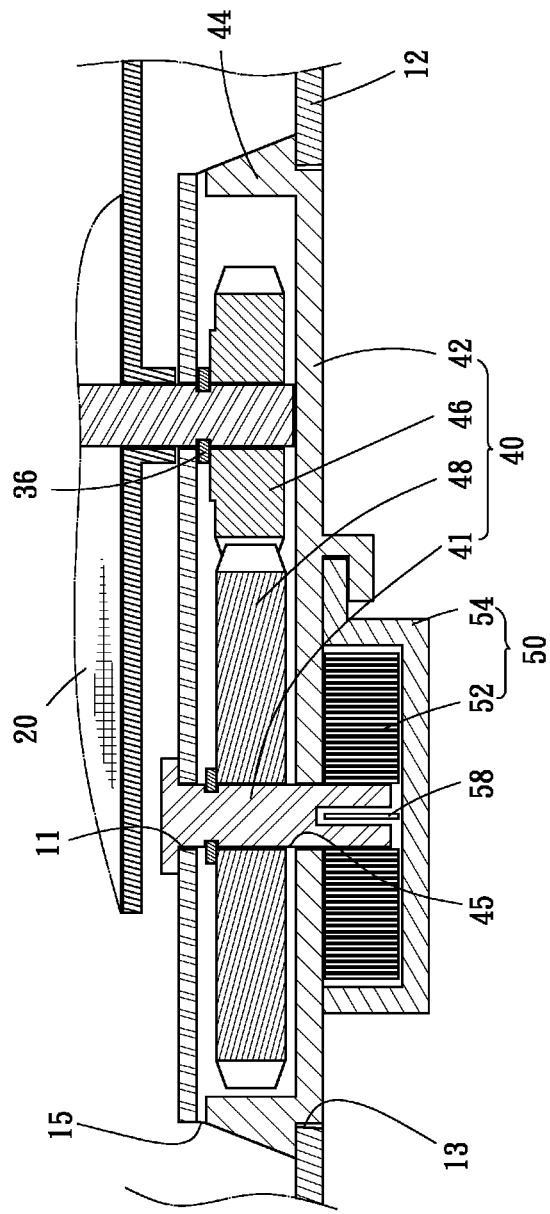
FIG. 6 is a cross-sectional view of the tow strap apparatus taken along a line C-C shown in FIG. 5.

The casing 12 includes two halves each including an aperture 11 defined therein, a cavity 13 defined in an external side (FIG. 4), and two opposite cutouts 16 defined in the edge thereof. By screws 14, the halves of the casing 12 are joined so that the cutouts 16 form two opposite slots 18. One of the halves of the casing 12 further includes two opposite apertures 15 in communication with the cavity 13 (FIG. 6).

The reel 31 includes an axle 30 and two discs 38. Each of the discs 38 includes a hub 33 formed thereon and an aperture 35 defined in the hub 33. The axle 30 includes a slot 32 defined therein, a butt 34 formed at an end, and an annular groove defined near an opposite end. The axle 30 is fit in the discs 38.

Figure 3:
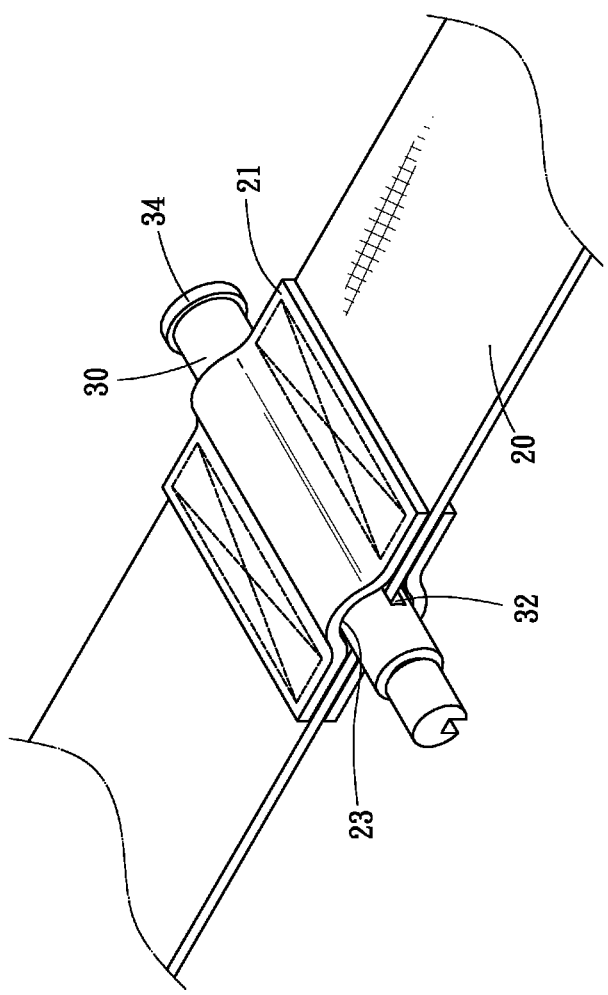
FIG. 3 is a perspective view of a webbing of a tow strap connected to a reel of the tow strap apparatus shown in FIG. 1.
Figure 4:
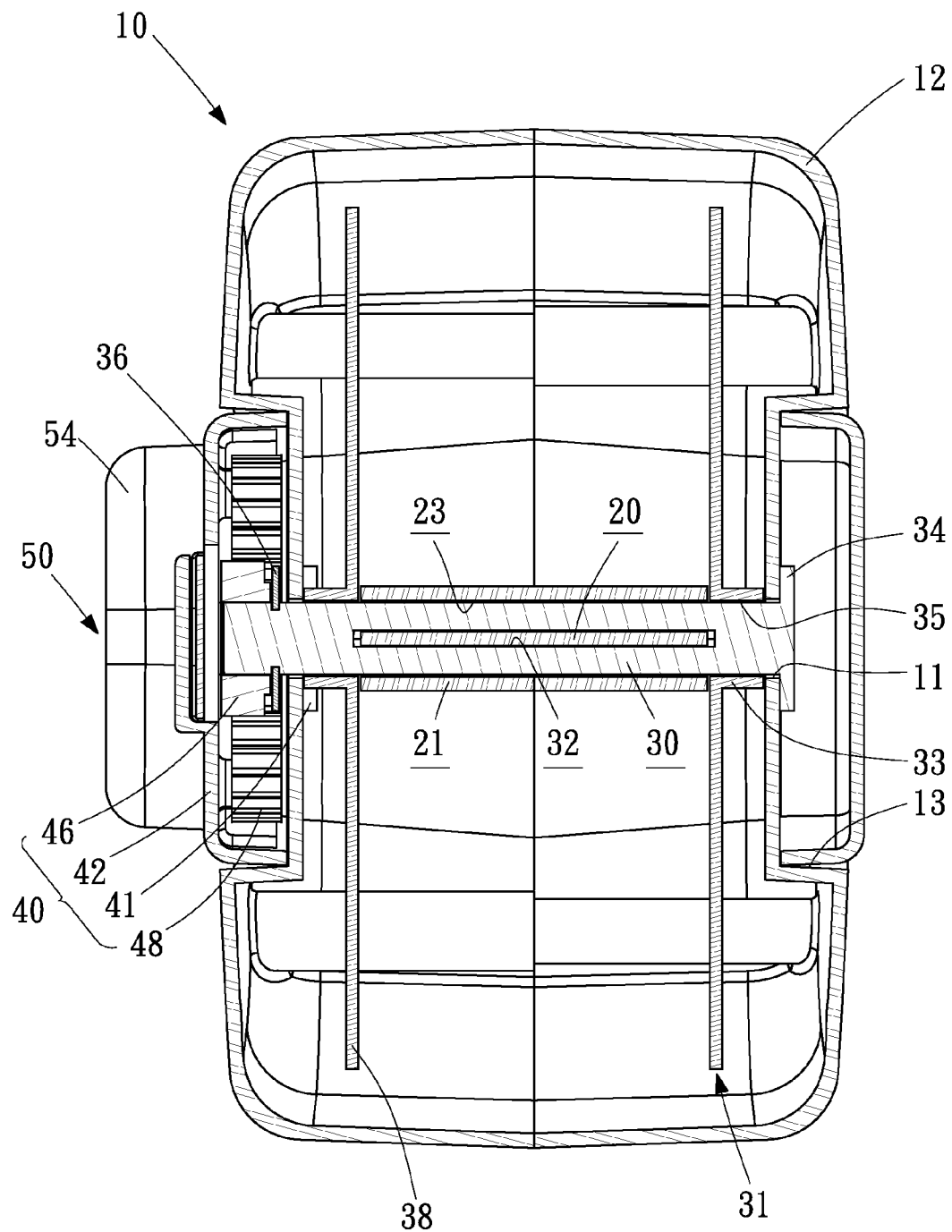
FIG. 4 is a cross-sectional view of the tow strap apparatus taken along a line A-A shown in FIG. 1.
Figure 5:
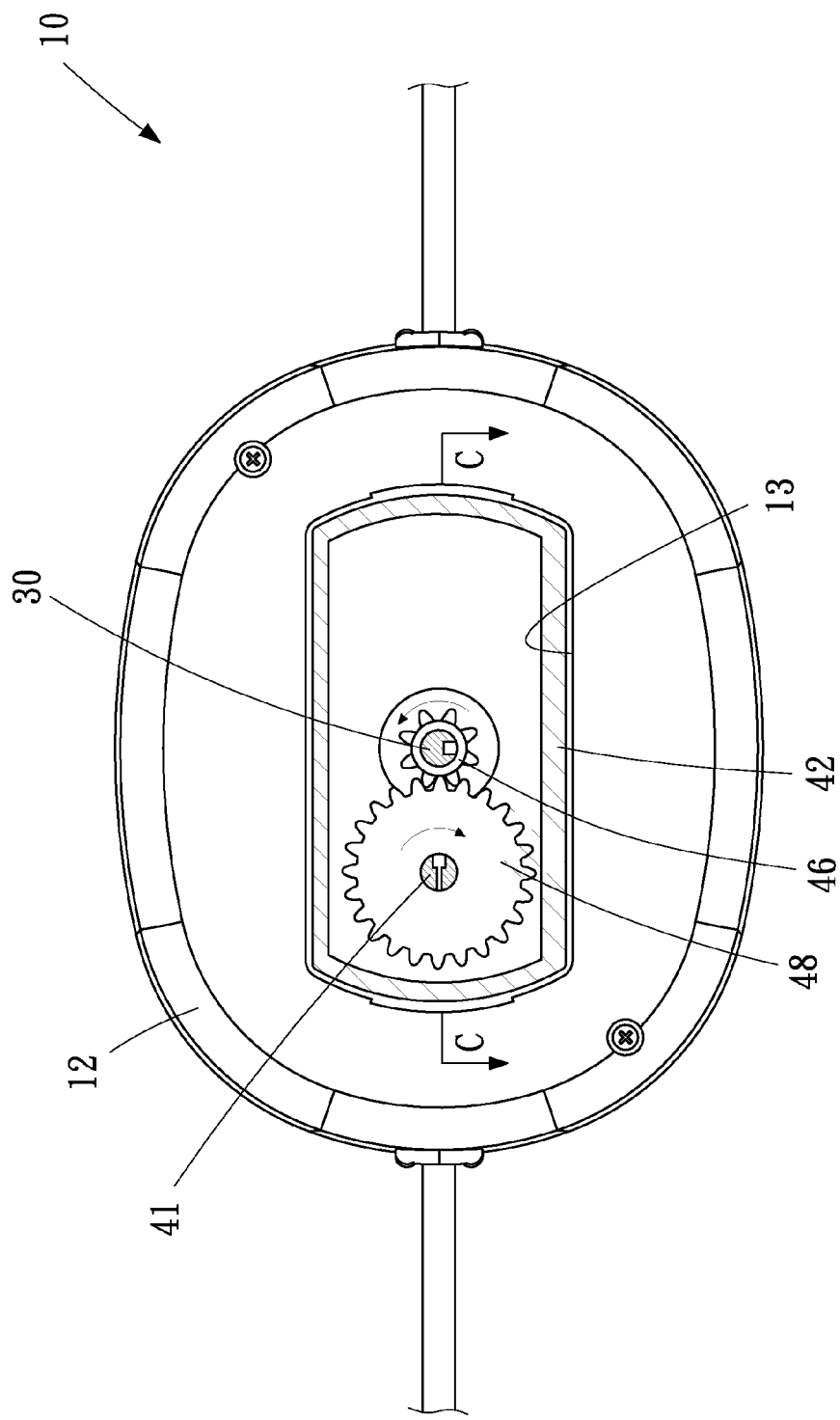
FIG. 5 is a cross-sectional view of the tow strap apparatus taken along a line B-B shown in FIG. 1.

Referring to FIG. 3, the tow strap 20 is inserted through the slot 32. By sewing for example, a patch 21 is attached to each side of the tow strap 20 so that the patches 21 together form a loop 23 for wrapping the axle 30. Thus, the tow strap 20 is firmly held onto the axle 30, i.e., the tow strap 20 cannot slide relative to the axle 30. Each of the hooks 24 includes, at an end, a ring 26 for receiving a corresponding end 22 of the tow strap 20. The tow strap 20 may be made of nylon or any other proper material with a length of five, ten or twenty feet for example. The patches 21 may be made of nylon or any other proper material. The tow strap 20 and the patches 21 are preferably made of a same material.

The reel 31 is substantially placed in the casing 12 except that each end of the axle 30 is placed out of the casing 12 through a corresponding aperture 11. A clip 36 is placed in the annular groove of the axle 30. The axle 30 is positioned by the butt 34 and the clip 36. Each hub 33 is placed against a corresponding half of the casing 12. The tow strap 20 is placed between the discs 38. Each end of the tow strap 20 is placed out of the casing 12 via a corresponding one of the slots 18. The hooks 24 are placed out of the casing 12.

The speed-increasing gearbox 40 includes an axle 41, a shell 42, a small gear 46 and a large gear 48. The axle 41 includes a butt formed at an end and a slit 43 defined therein. The axle 41 is supported on one of the halves of the casing 12 rotationally. The butt of the axle 41 is placed against an internal side of the half of the casing 12 and another clip 36 is placed in an annular groove defined in the axle 41 and against an external side of the half of the casing 12 to keep the axle 41 on the half of the casing 12.

The large gear 48 is secured to the axle 41 so that they are rotatable together. To this end, the large gear 48 includes, on an internal side, a rib fit in the slit 43 of the axle 41. The small gear 46 is secured to the reel 31 so that they are rotatable together. To this end, the small gear 46 includes, on an internal side, a rib fit in a groove defined in the axle 30. The small gear 46 is meshed with the large gear 48. For example, the large gear 48 includes twenty-four teeth while the small gear 46 includes eight teeth so that the small gear 46 rotates for three rounds as the large gear 48 rotates for one round.

The shell 42 includes two barbs 44. The barbs 44 are placed in the apertures 15 when the shell 42 is attached to the casing 12. The large gear 48 and the small gear 46 are kept in the cavity 13 and covered by the shell 42. The shell 42 may be connected to the casing 12 by screws instead of the barbs 44 inserted in the apertures 15.

The driving unit 50 includes a coil spring 52 and a cover 54. The coil spring 52 includes an external end 56 for hooking a tab extending from an internal side of the cover 54 and an internal end 58 inserted in the slit 43. The cover 54 is connected to the casing 12.

The coil spring 52 is loaded as the tow strap 20 is unwound from the reel 31. The coil spring 52 exerts adequate stress in the tow strap 20 to suspend the tow strap 20 as the tow strap 20 is unwound from the reel 31. The tow strap 20 can be wound onto the reel 31 by the coil spring 52 via the speed-increasing gearbox 40.

The tow strap apparatus 10 exhibits at least two advantages. At first, the tow strap 20 is reliable since it is firmly connected to the axle 30 by the patches 21, not by teeth as in the prior art. Secondly, it is light and inexpensive since the speed-increasing gearbox 40 enable the use of a small coil spring to wind a long tow strap onto the reel 31.

Figure 7:
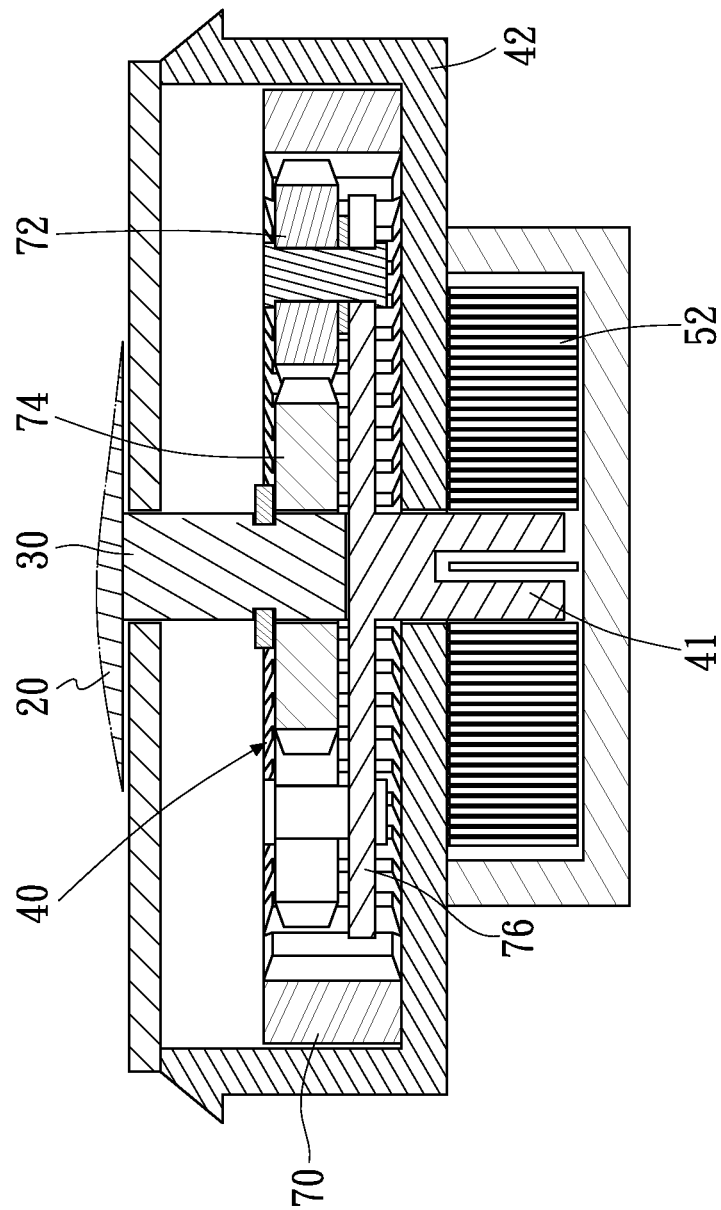
FIG. 7 is a cross-sectional view of a tow strap apparatus according to the second embodiment of the present invention.
Figure 8:
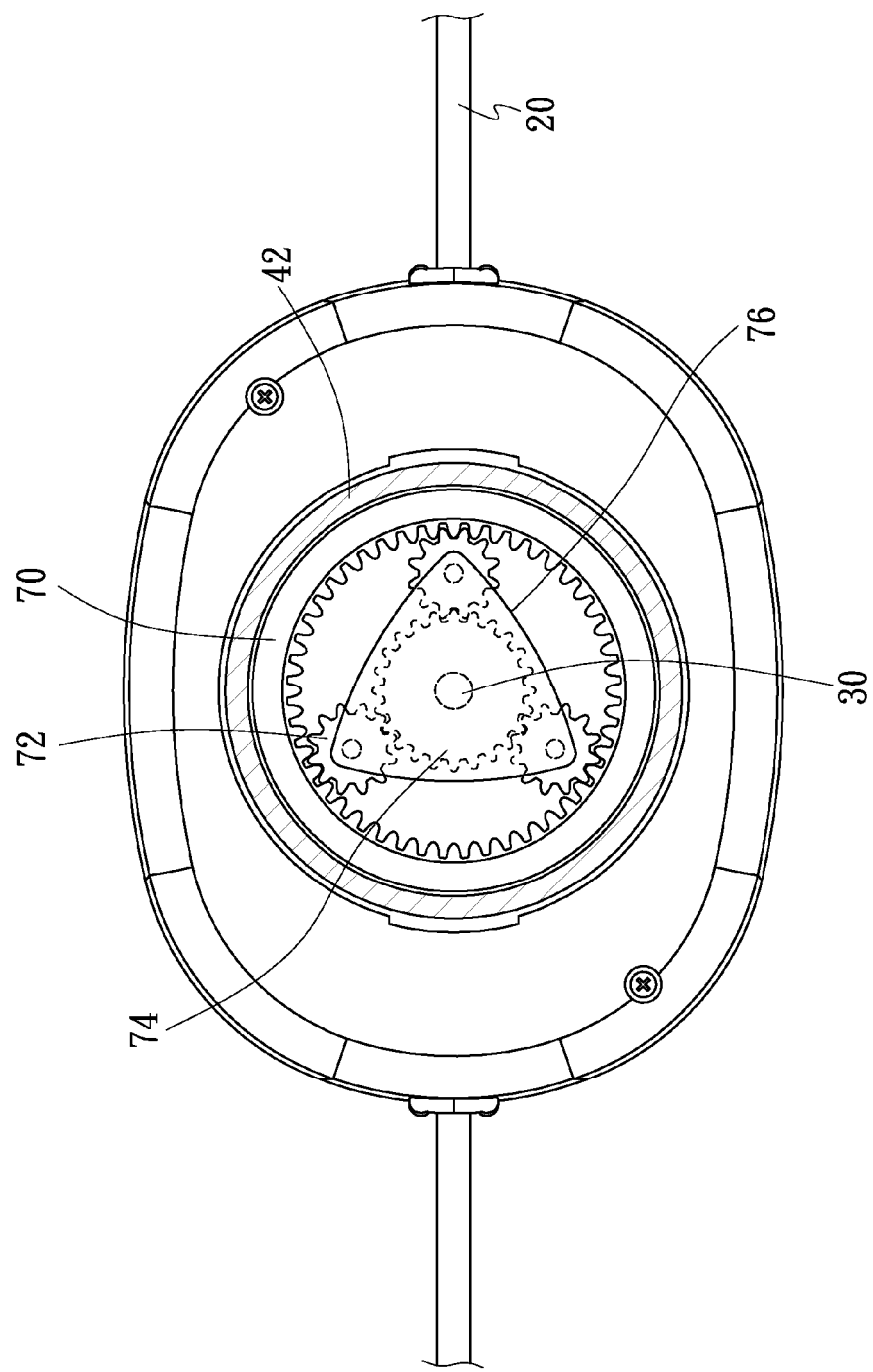
FIG. 8 is another cross-sectional view of the tow strap apparatus shown in FIG. 7.

Referring to FIGS. 7 and 8, there is shown a tow strap apparatus according to a second embodiment of the present invention. The second embodiment is like the first embodiment except several things. At first, the reel 31 does not include the discs 38. Secondly, the speed-increasing gearbox 40 includes a planetary gear train instead of the large gear 48 and the small gear 46.

The planetary gear train inherently includes an internal gear 70, several planetary gears 72, a sun gear 74 and a carrier 76. There are three planetary gears 72 for instance. The planetary gears 72 and the sun gear 74 are supported on the carrier 76. Each of the planetary gears 72 is meshed with the internal gear 70 and the sun gear 74.

The internal gear 70 is non-rotationally placed in the shell 42. The carrier 76 is connected to the axle 41 so that they are rotatable together. The sun gear 74 is connected to the axle 30 so that they are rotatable together.

The coil spring 52 rotates the axle 41 as well as the carrier 76. The carrier 76 rotates the sun gear 74 as well as the reel 31 via the planetary gears 72. The axles 41 and 30 rotate in a same direction.

Preferably, the internal gear 70 includes forty-eight teeth, each of the planetary gears 72 includes twelve gears, and the sun gear 74 includes twenty-four teeth. Thus, the sun gear 74 rotates for four rounds as the carrier 76 rotates one round.

The present invention has been described via the detailed illustration of the embodiments. Those skilled in the art can derive variations from the embodiments without departing from the scope of the present invention. Therefore, the embodiments shall not limit the scope of the present invention defined in the claims.

The invention claimed is:

1. A tow strap apparatus including:
   a casing;
   a reel rotationally supported in the casing;
   a tow strap reeled on the reel;
   a driving unit supported on the casing; and
   a speed-increasing gearbox including a small gear connected to the reel so that they are rotatable together;
   a large gear engaged with the small gear and connected to the driving unit;
   an axle supported on the casing and formed with a portion connected to the large gear so that they are rotatable together, another portion connected to the driving unit, and a butt placed against a side of the casing; and
   a clip fit on the axle and placed against an opposite side of the casing to retain the axle on the casing.

2. The tow strap apparatus according to claim 1, wherein the driving unit includes a coil spring connected to the casing at an end and connected to the reel at another end, wherein the coil spring is loaded as the tow strap is unwound from the reel, wherein the coil spring exerts adequate stress in the tow strap to have the tow strap suspend as the tow strap is unwound from the reel, wherein the tow strap can be wound onto the reel by the coil spring via the speed-increasing gearbox.

3. The tow strap apparatus according to claim 2, wherein the driving unit further includes a cover attached to the casing for covering the coil spring.

4. The tow strap apparatus according to claim 1, wherein the axle includes a slit defined therein, wherein the driving unit includes a coil spring formed with an end inserted in the slot of the axle and another end connected to the casing.

5. The tow strap apparatus according to claim 1, wherein the gearbox includes a shell attached to the casing for shielding the small and large gears.

6. The tow strap apparatus according to claim 1, wherein the gearbox includes:
   an internal gear non-rotationally supported on the casing;
   a carrier rotationally placed in the internal gear and connected to the driving unit;
   planetary gears rotationally supported on the carrier and meshed with the internal gear; and
   a sun gear connected to the reel so that they are rotatable together and meshed with the planetary gears.

7. The tow strap apparatus according to claim 6, wherein the gearbox further includes an axle connected to the carrier so that they are rotatable together and connected to the driving unit.

8. A tow strap apparatus including:
   a casing;
   a reel rotationally supported in the casing and formed with a slot through the tow strap is inserted;
   a tow strap reeled on the reel;
   a driving unit supported on the casing;
   a gearbox for connecting the driving unit to the reel; and
   at least one patch attached to the tow strap to form a loop for receiving the reel.

9. A tow strap apparatus including:
   a casing;
   a reel formed with a slot and rotationally supported in the casing;
   a tow strap inserted through the slot;
   at least one patch attached to the tow strap to form a loop for receiving the reel; and
   a driving unit supported on the casing to drive the reel.

10. The tow strap apparatus according to claim 9, further including a gearbox for connecting the driving unit to the reel.

* * * * *